United States Patent
Koerner

(10) Patent No.: US 8,494,886 B2
(45) Date of Patent: Jul. 23, 2013

(54) EMBEDDING PLANNING COMPONENTS IN TRANSACTIONAL APPLICATIONS

(75) Inventor: Hartmut Koerner, Ladenburg (DE)

(73) Assignee: SAP AG, Walldorf (DE)

( * ) Notice: Subject to any disclaimer, the term of this patent is extended or adjusted under 35 U.S.C. 154(b) by 563 days.

(21) Appl. No.: 12/764,623

(22) Filed: Apr. 21, 2010

(65) Prior Publication Data

US 2011/0264487 A1 Oct. 27, 2011

(51) Int. Cl.
*G06Q 30/00* (2006.01)
(52) U.S. Cl.
USPC .............. 705/7; 705/10; 705/35; 705/36 R
(58) Field of Classification Search
USPC ................... 705/7, 10, 35, 36, 36 R
See application file for complete search history.

(56) References Cited

U.S. PATENT DOCUMENTS

| | | | | |
|---|---|---|---|---|
| 2008/0163083 A1* | 7/2008 | Brunswig et al. | | 715/762 |
| 2008/0313596 A1* | 12/2008 | Kreamer et al. | | 717/101 |
| 2009/0018996 A1* | 1/2009 | Hunt et al. | | 707/2 |
| 2009/0192867 A1* | 7/2009 | Farooq et al. | | 705/10 |
| 2010/0070425 A1* | 3/2010 | Cornford | | 705/348 |

* cited by examiner

*Primary Examiner* — Nga B. Nguyen
(74) *Attorney, Agent, or Firm* — Kenyon & Kenyon LLP

(57) ABSTRACT

Two configurable user interface building blocks, an analytics list building block and a search building block, may interface with business planning data in both business intelligence systems and enterprise resource planning systems through an application controller to provide business planning models and applications. The search building block may include parameters to select fields from queries, filters, planning functions, and sequences to filter data included in the planning model. The analytics list building block may provide an interface for customizing components of business planning models. The application controller may ensure application integrity, execute a planning function on the data in the business planning model, and populate an interface with data.

20 Claims, 7 Drawing Sheets

Component Configuration ZTRPL_A02_LIST2

Path ZTRPL_A03 > ZTRPL_A03_OIF > ZTRPL_A02_LIST2

[Change] [New Window] [Check] [Refresh] | View: [Component-Defined ▼]

Query 301
ZTRLP_Q01

List Settings 302
- Title Visible: ☑
- Title:
- Filter Allowed: ☑
- Settings Dialog Visible: ☑
- Column Selection Allowed: ☑
- Calculation Allowed: ☑
- Saving Views Allowed: ☐
- Sorting Allowed: ☐
- Changing Display Type Allowed: ☐
- Export Allowed: ☑
- Printing Allowed: ☑
- Aggregate Over Invisible Characteristics: ☑
- Goto Allowed:
  - ⦿ BEx Web Analyzer (ABAP)
  - ○ BEx Web Analyzer (JAVA)
  - ○ Simple List Report (WD ABAP)
- Number of Rows: 10
- Display Columns: All
- Number of Fixed Columns: 0

Toolbar Elements 303
[Add ▼] [Delete] [▶] [◀]

| Display Type | Label | Tooltip | FPM Event ID |
|---|---|---|---|
| Button Choice | Create Proposal | | |

Button Choice Items 304
[Add Entry] [Delete] [▶] [◀]

| Label | FPM Event ID |
|---|---|
| ... from Actual Date | BSA_PLSEQU |
| ...from Last Year Plan | |
| ... from P&L Plan | |

Event Parameters 305
[Add Parameter] [Delete Parameter]

| Parameter Name | Parameter Value |
|---|---|
| PLSEQU | ZTRPL_E01 |

EMBEDDING PLANNING COMPONENTS IN TRANSACTIONAL APPLICATIONS

BACKGROUND

Business planning is used by many organizations to evaluate business strategies by using existing data to forecast future events and assessing the impact of the strategies on the forecasted events. Alternatively, businesses may also chose to retrospectively assess the impact of strategies on past events using past data. Because business planning processes and strategies are customer specific depending on the industry and structure of a business, previous business planning applications were highly customized for each business customer, and often required a computer programmer to write specialized computer code based on the specific planning requirements of the business. In many instances when a business's planning needs changed, the specialized computer code would also have to be modified resulting in additional delays and expenses for the business.

While some existing business planning applications provide graphical user interfaces for typical business users with no computer programming experience to create and modify planning models, these existing applications can only create simple models that offer limited functionality. For example, the existing applications may only interface with specific data, such as data stored in a data warehouse of a business intelligence system. Organizational data that is not stored in the business intelligence system, such as customer data stored in a customer relationship management (CRM) system, enterprise resource planning (ERP) system, or as part of a larger business suite, may not be added into the planning model. Additionally, these existing applications may require use of specific software, such as a Java® Server, which may not easily integrate into other systems using different software, such as ERP systems using Advanced Business Application Programming (ABAP).

Therefore, there is a need for a business planning system having planning models that can be changed at the customer side by business users without computer programming skills that can interface with data in both business intelligence systems and ERP systems in ABAP.

BRIEF DESCRIPTION OF THE DRAWINGS

FIG. 3 shows an exemplary configuration of an analytics list building block in an embodiment.

DETAILED DESCRIPTION

Figure 1:
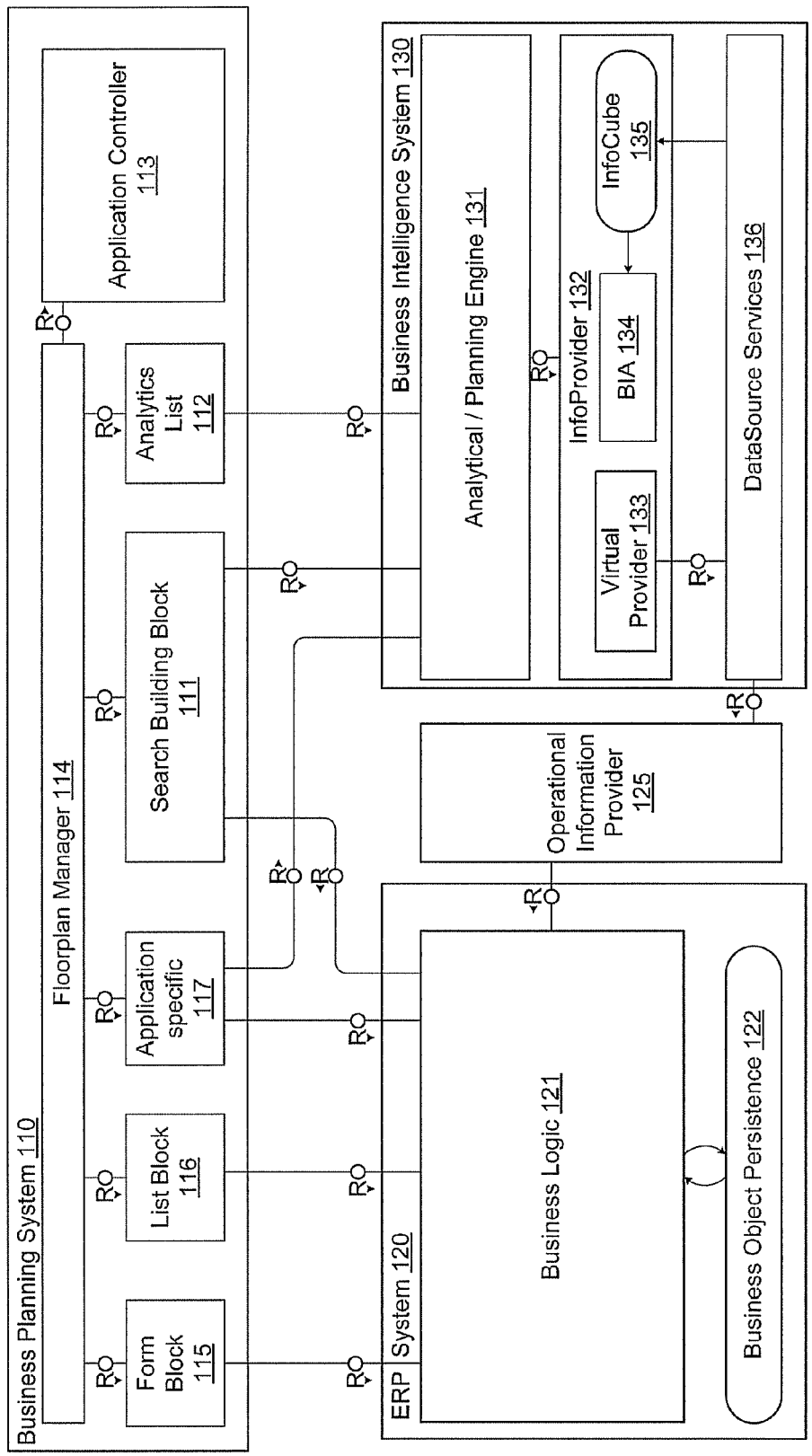
FIG. 1 shows an exemplary architecture in an embodiment of the invention.

In an embodiment of the invention, two configurable user interface building blocks, an analytics list building block and a search building block, may interface with business planning data in both business intelligence systems and ERP systems through an application controller to provide business planning models. At runtime, the search building block may create a variable filter interface for user entry of specific values of preselected fields used in queries, filters, planning functions, and sequences. These fields may be selected at design-time along with a feeder class that transfers the values of the fields from these backend systems to the interface.

The analytics list building block may provide an interface for customizing individual components of business planning models based on a selected business intelligence system query. In an embodiment, after a query in the business intelligence system is selected for the planning model, the analytics list building block may retrieve parameters associated with the query from the business intelligence system. Based on the retrieved parameters, toolbar elements or button choice items may be individually configured to perform specific functions.

The application controller may ensure application integrity when executing a business planning model by verifying data retrieved from business intelligence and ERP systems through the analytics list and search building blocks. The application controller may also populate a user interface with the data retrieved by the analytics list and search building blocks and execute a planning function on the data in the business planning model. The planning function may be executed by applying user entered values in the variable filter to a selected planning function. Although embodiments of the invention refer to interfacing the building blocks with an ERP system and a business intelligence system, other systems storing data of an organization, such as a CRM system or a Business Suite system, may replace or supplement the ERP system.

An exemplary method in an embodiment may include the steps of parsing a request to create a business planning application from the communications network, identifying a feeder class supplied during design-time configuration of the planning application, extracting a business planning function from the subset of data in the enterprise resource planning system using the provided functionality, the business planning function representing a step in an automated business process executed by the enterprise resource planning system, extracting stored data from the subset of data in the business intelligence system using the provided functionality, applying the extracted stored data to the business planning function to calculate a performance metric of the business planning function; and updating the calculation to reflect changes to the business planning function. The feeder class may transfer the values of data fields from a business intelligence system and/or a enterprise resource planning system to an interface where specific values for one or more of the transferred fields may be selected.

FIG. 1 shows an exemplary architecture in an embodiment of the invention. In this embodiment, the search building block 111, analytics list building block 112, and application controller 113 may be embedded in an existing floorplan manager application 114 that is part of a business planning system 110. The floorplan manager application 114 may be a Web Dynpro application that provides a framework for developing new Web Dynpro application interfaces consistent with a standard set of guidelines to ensure consistency among newly developed applications. In an embodiment, the Web Dynpro application may be an ABAP application including a model object that encapsulates an interface to a back end computing system. The floorplan manager application 114 may act as a proxy that detaches the Web Dynpro application from the data and functionality found in the back end system.

Thus, the Web Dynpro application may be independent of the specific communication technology required to interact with the back end system.

The search building block 111 may be configured to interact with both business intelligence 130 and ERP 120 systems. In an embodiment, the business intelligence system 130 may perform statistical analyses on stored data to identify historical patterns and predict future performance, whereas the ERP system 120 may be used to manage automated business processes. The analytics list building block 112 may be configured to interact only with the business intelligence system 130 and the application controller 113 may be configured to synchronize operations between search 111 and analytics list 112 building blocks through the floorplan manager 114.

The floorplan manager 114 may already include form 115 and list 116 building blocks linked to the ERP system 120, and application specific building block 117 linked to both the ERP 120 and business intelligence 130 systems. The ERP system 120 may include business logic 121 and persistence 122 and the business intelligence system 130 may include an analytical engine 131 linked to an information provider 132 which may include a virtual provider 133, accelerator 134, and info cube 135. Data Services 136 may interface with virtual provider 133, info cube 135, and operational information provider 125 to transfer data between the ERP system 120 and the business intelligence system 130.

Figure 2:
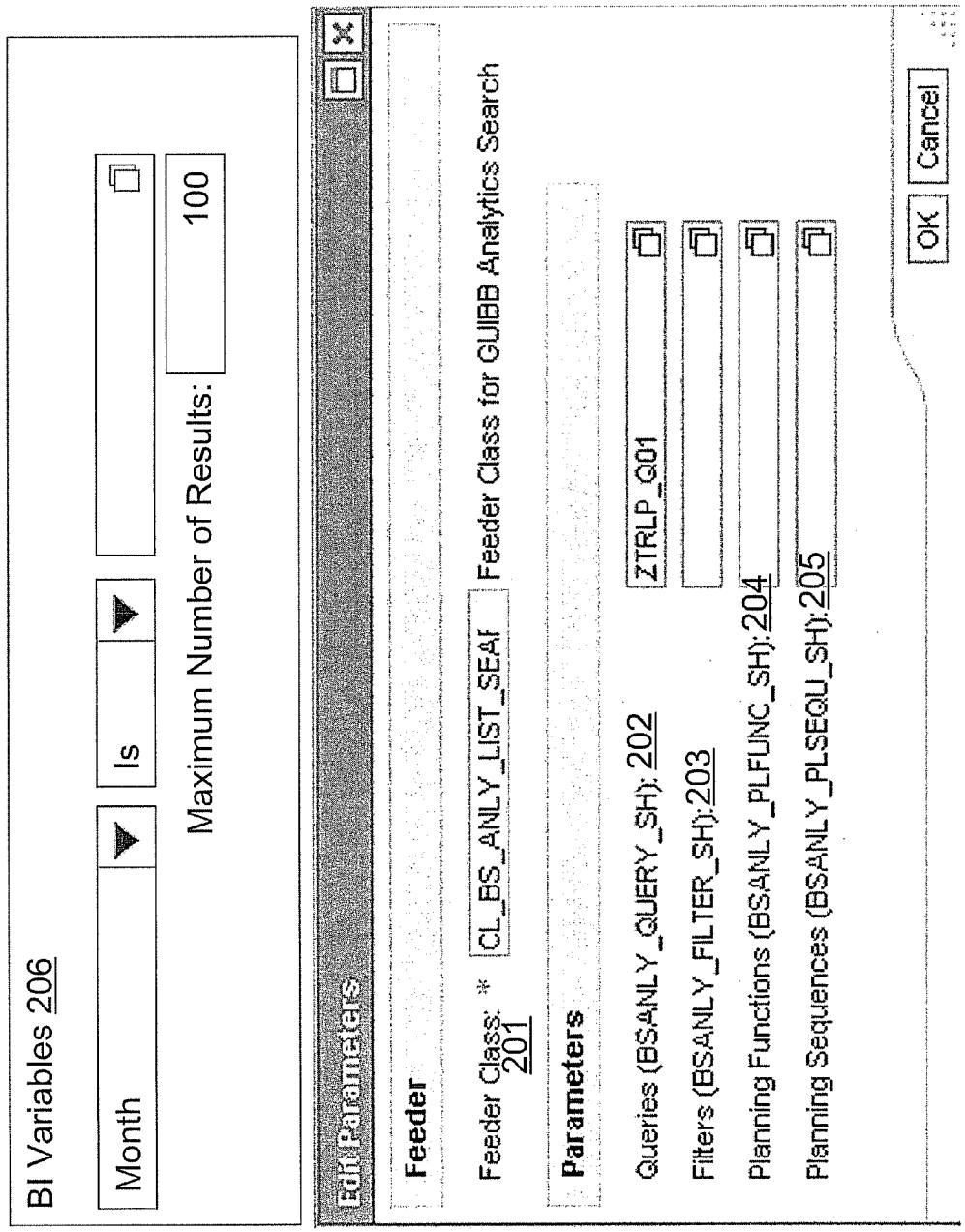
FIG. 2 shows an exemplary embodiment of the configuration of a search building block.

FIG. 2 shows an exemplary embodiment of the configuration of a search building block 111. In an embodiment, a feeder class 201 may be used to transfer fields, such as the field "month" shown in FIG. 2, between a database in the business intelligence 130 or the ERP 130 systems and an interface, which may be a user interface. Because different ERP and business intelligence systems 120 and 130 may use different protocols, data formats, and languages, each feeder class 201 may be customized to transfer data fields from each system.

Once the feeder class 201 has been selected, the search building block 111 may enable the selection of additional parameters that determine which search fields in queries 202, filters 203, planning functions 204, and planning sequences 205 are shown in the BI variable filter 206 at runtime, such as the search field "month." At runtime, a user may enter additional values for these search fields to enable a focused selection of particular data included in the planning application output. In an embodiment, a query, filter, planning function, or planning sequence linked to the selected feeder class 201 may be parsed to identify valid search fields for the query, filter, planning function, or planning sequence from which a user can select.

In an embodiment, the query parameter 202 may identify a business intelligence query at the business intelligence system 130. The query parameter 202 may identify the fields transferred from the feeder class 201 that are included in the variable filter 206 at runtime. The filter parameter 203 may function in a similar manner. These parameters 202 and 203 may be defined within a planning engine of the business intelligence system 130. The ERP system 120 may store the actual data used in the planning application. This data may be accessed by the planning engine in the business intelligence system 130 through the Operational Information Provider 125.

The planning functions 204 and planning sequences 205 parameters may function similarly to the query parameter 202, though they may identify planning functions and sequences defined in the business intelligence system 130 instead of queries. Business planning processes, such as forecasting, copying, and other planning functions, may be executed at the business intelligence system 130 using data retrieved from the ERP system 120 through the Operational Information Provider 125. Since business planning revolves around business processes, the business planning function 204 and sequence 205 parameters allow the selection of data fields for searching in the variable filter 206 at runtime that may be incorporated in relevant business processes.

In an embodiment, the planning functions and sequences parameters 204 and 205 may be used to select specific data fields containing results of a business process to be searched at runtime in the ERP system 120. For example, when performing liquidity planning, an organization may want to assess or change its business processes relating to cash assets, investments, or cash debt coverage. By incorporating data fields used in business process steps in the planning model, it is possible to directly calculate the liquidity implications of changes to one or more of the steps in each process. Changes to the data fields specified in the planning functions and sequences parameters 204 and 205 may be incorporated in the planning model by calculating an impact of business process steps. The data may be identified from the business process steps through parsing. The search building block may contain logic restricting the selection of business process steps in the planning parameters 204 and 205 to those steps that are within the subset of data included in the feeder class.

A planning function may be an algorithm or other part of a business process. User supplied values in the variable filter 206 may be used at runtime as a data set to be used in the planning function. An executable planning function may be a tuple of a planning function and a filter with the filter determining the set of data the function may be executed on. A planning sequences may include a list of tuples of planning functions and corresponding filters. For example, a planning sequence may include multiple planning functions arranged in a sequential order. Alternatively, a planning sequence may include several steps of a business process arranged in a sequential order that may be included as a part of a planning function. The planning sequences parameter 205 may include a data field from a selected planning sequence that is to be included in the search building block for searching at runtime.

The BI variable filter 206 may be displayed at runtime and include each of the search fields identified in parameters 202 to 205. At runtime, a user may select one of the search fields and enter additional search criteria or search terms to further limit or narrow the results of the planning application.

FIG. 3 shows an exemplary configuration of an analytics list building block in an embodiment. The analytics list building block may be used to configure the functionality of a business planning model. A business intelligence system query 301 may be initially selected. The planning model may be configured to output for display the results of the query 301. The query 301 may be structured to return business planning results that change based on changes to the variable filter 206. The analytics list may also contain various display settings 302, in which the visual properties of the business planning model interface can be selected. For example, the display settings 302 may allow display of a title for the planning model, may allowing filtering or sorting of planning model results, may allow exporting and printing of results, and may allow a specific number of columns and rows to be displayed.

The analytics list building block may allow additional user interaction with the planning model results through the addition of a navigation element, such as toolbar element 303. A toolbar element 303 may be a customizable button, drop down menu choice, hyperlink, or other functional element causing a particular task to be executed. The toolbar element 303, in this example a button labeled "Create Proposal" may be linked to a button choice item 304. The button choice item 304 may present a user with one or more options for executing events relating to the toolbar element 303. The options may vary depending on the selected query 301. In an embodiment, the button choice items 304 may be configured with options for different events in the floorplan manager application 114 associated with the selected query 301. The events in the floorplan manager application 114 may be stored in a lookup table or memory.

Each button choice item 304 may perform an event, such as creating a proposal, and may have one or more event parameters 305 associated with it. An event parameter 305 may be a specific task or function to be executed and the associated button choice item 304 may be a component of the specific task or function. For example, the parameter PLSEQU with parameter value ZTRPL_E01 may correspond to a planning sequence "ZTRPL_E01" that is to be executed when a users clicks on the associated button 304 configure planning functions event 305. When this event parameter 305 is combined with the " . . . from Actual Data" button choice item 304 with event ID BSA_PLSEQU, this may cause the planning sequence to be executed and planning functions to be configured using actual data. Thus, clicking on the "Create Proposal" toolbar element 303 may cause the floorplan manager application 114 to show the results of reconfiguring the planning functions using actual data.

In other embodiments, different event parameters 305 may be associated with different button choice items 304. For example, event parameters 305 could be linked to specific planning functions instead of a planning sequence.

At design-time, as shown in FIGS. 2 and 3, a feeder class 201 may be selected and the business planning application may be configured to integrate components of the business intelligence system, such as queries, filters, planning functions, and planning sequences, with the building blocks of the planning application, including the analytics list and search building blocks 111 and 112.

Figure 4:
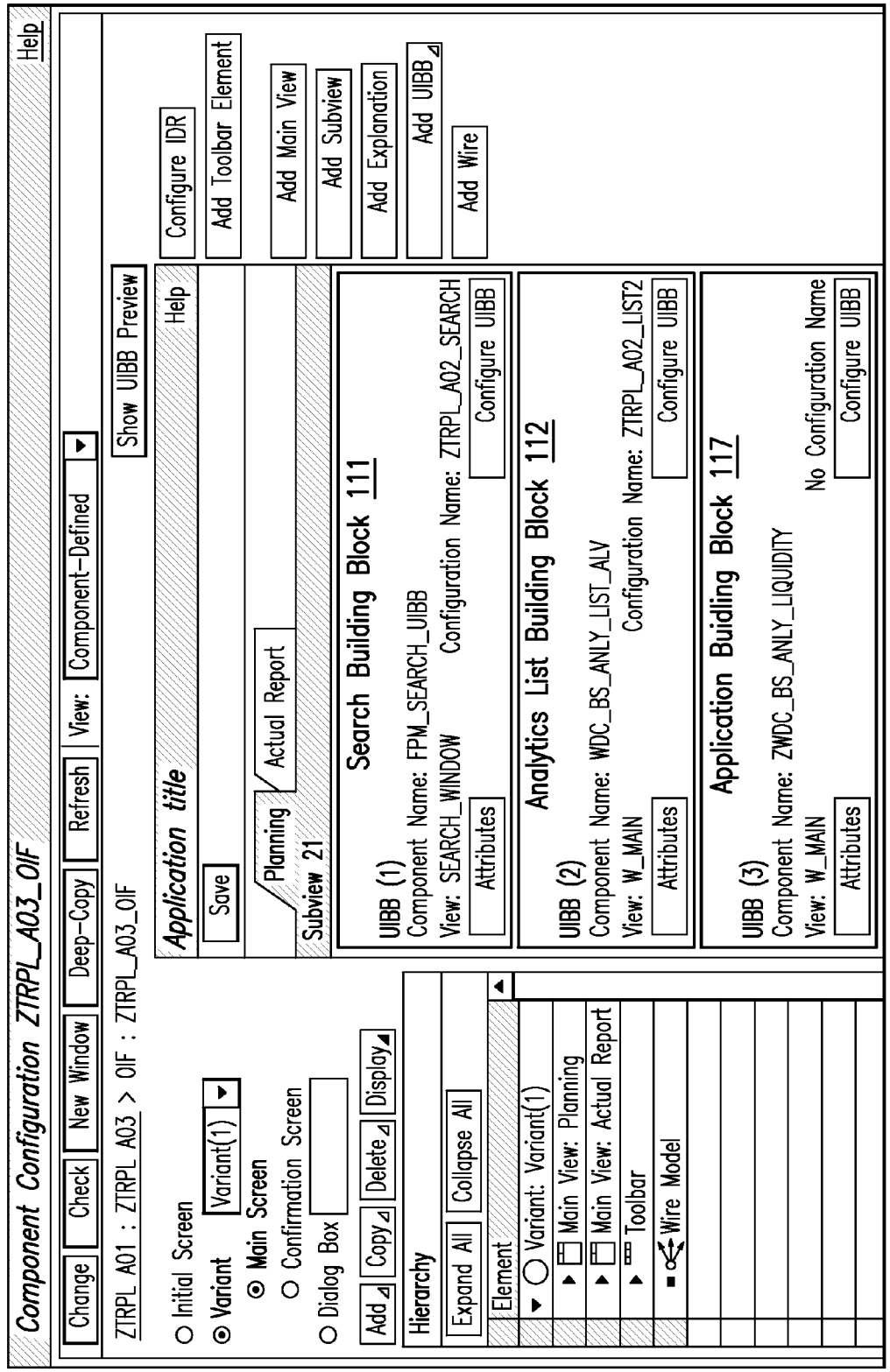
FIG. 4 shows an exemplary combination of a search building block and analytics list building block in an embodiment

FIG. 4 shows an exemplary combination of a search building block 111 and analytics list building block 112 in an embodiment. In this embodiment, a first variant of a business planning model including linked search building block 111 and analytics list building block 112 is shown. Additional search 111 and/or analytics list 112 building blocks may be included and linked to the business planning model by adding them under the planning tab. Additionally, multiple variants of a business planning model may be created through the drop-down variant menu. Thus, different business planning models may have multiple linked building blocks 111 and 112.

Figure 5:
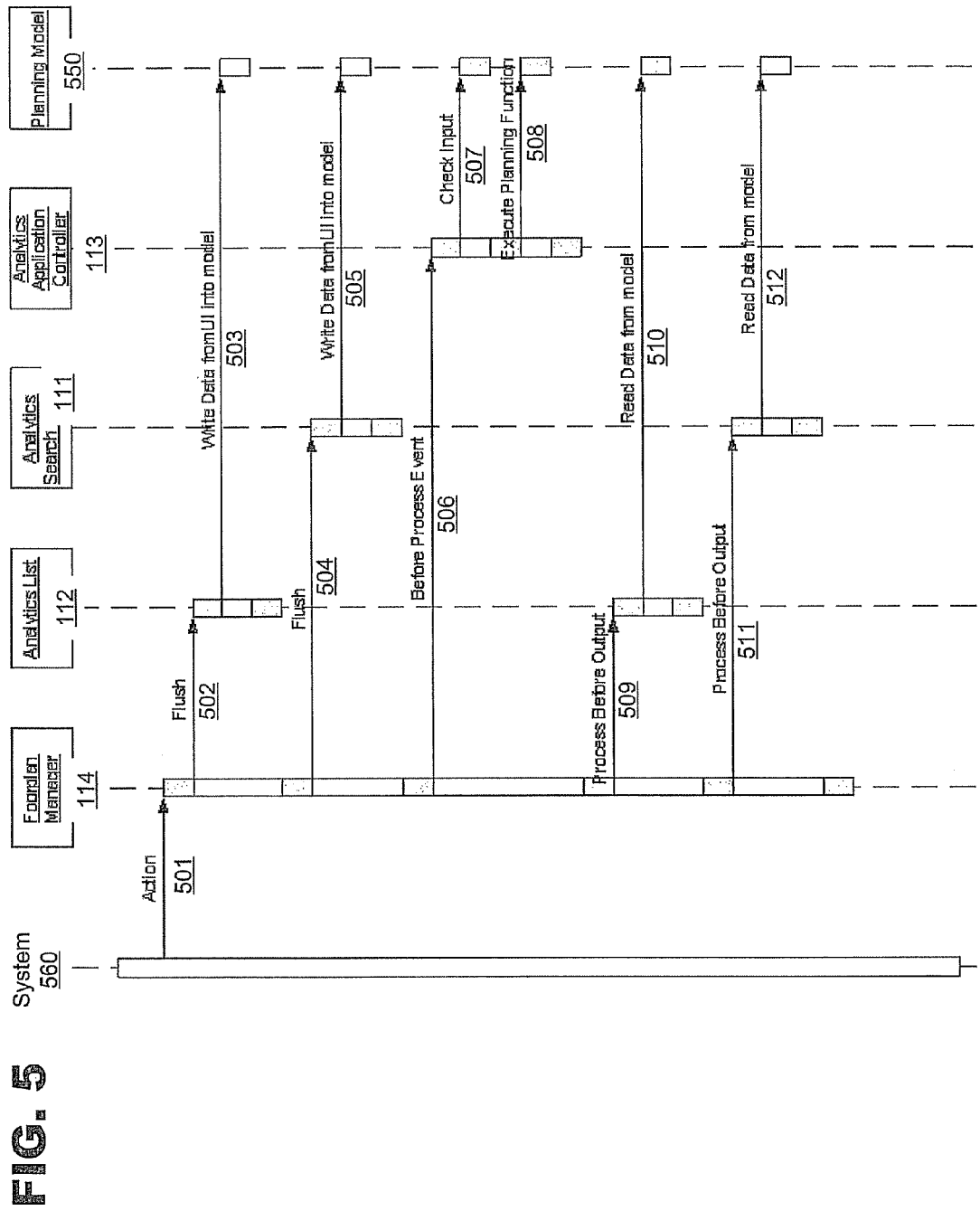
FIG. 5 shows an exemplary data flow in an embodiment.
Figure 6:
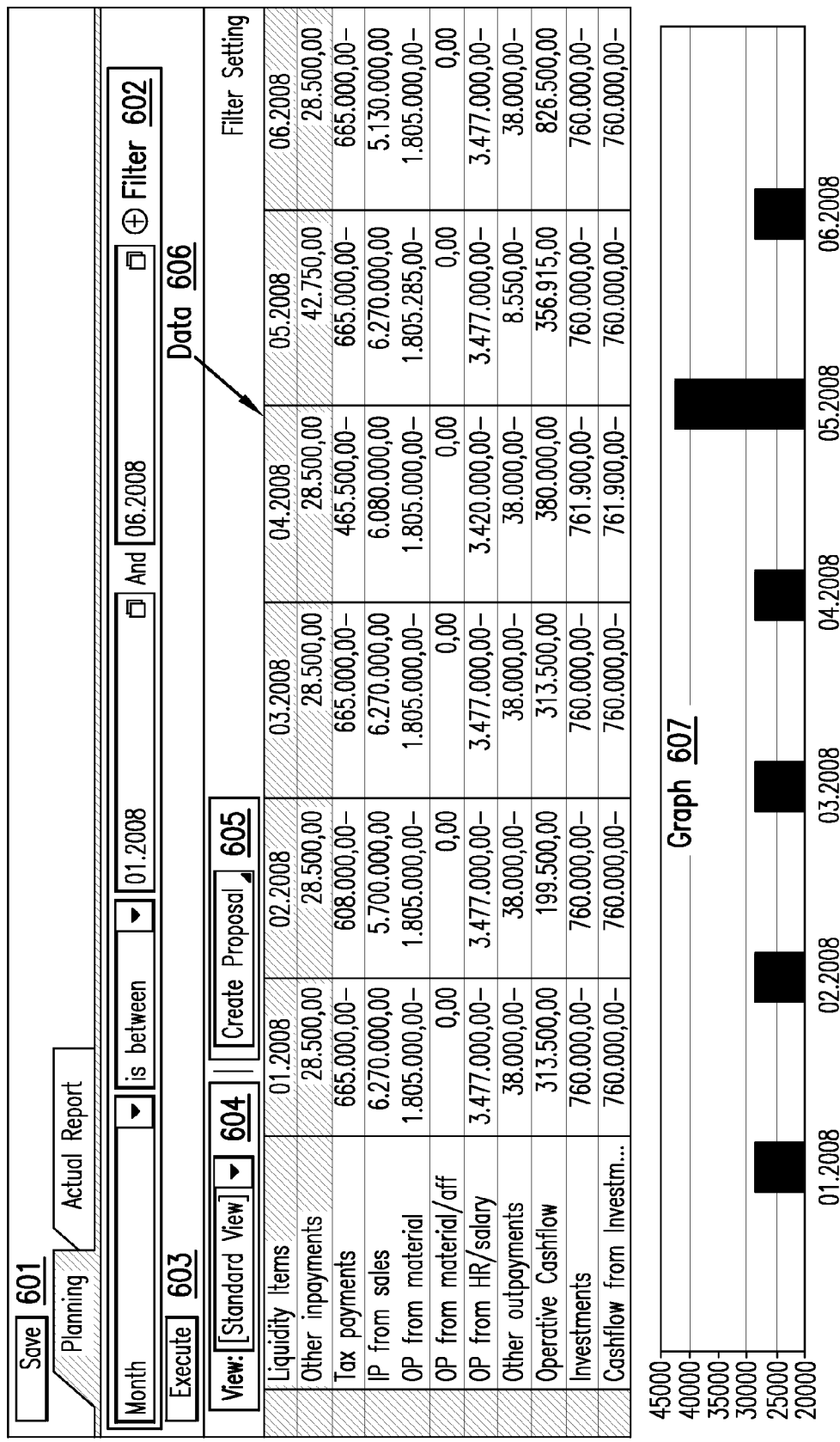
FIG. 6 shows an exemplary output in an embodiment of the invention.

FIG. 5 shows an exemplary runtime data flow in an embodiment and FIG. 6 shows an exemplary output at runtime in an embodiment of the invention. In an embodiment, a user action 501 to generate a business planning application may be sent to the floorplan manager application 114 in business planning system 110. The action 501 may be initiated at a user computing system 560 or other computing system in a network when the user clicks on a button in the interface or engages in other acts triggering creation of a business planning application.

After receiving the action request 501, the floorplan manager application 114 may transfer data entered or selected by a user at a user interface to a backend system. This data may include values selected in the filter 602, such as "Month is between 01.2008 and 06.2008" as shown in FIG. 6, and may also include some data elements shown as data 606, such as the "Other inpayments" liquidity item row.

In the first flush phase 502, selected data obtained through the analytics list building block 112, such as the selected "Other inpayments" liquidity item row in data 606 may be written 503 into the planning model 550. Other data from the analytics list building block 112 may include business intelligence system query information 301, display settings 302, toolbar elements 303, button choice items 304, and event parameters 305 The data in the analytics list building block 112 may be restructured into a format compatible with an application for creating a planning model 550, and then written 503 into the planning model 550.

In the second flush phase 504, selected data obtained through the analytics search building block 111, such as values selected for specific data fields in filter 602, such as the values of data field Month being between 01.2008 and 06.2008, may be written 505 into the planning model 550. Data obtained through the analytics search building block 111 may include values for data fields specified by the following parameters: feeder class 201, queries 202, filters 203, planning functions 204, and planning sequences 205. The data in the analytics search building block 111 may be restructured into a format compatible with an application for creating a planning model 550, and then written 505 into the planning model 550.

The flush and write phases 502, 503, 504, and 505, may be repeated for different building blocks 111 and 112 where the business planning application interfaces with data from multiple sources or in multiple formats where multiple building blocks 111 and 112 may be used or necessary.

After the write phases 503 and 505 are complete for each of the building blocks 111 and 112 used in a business planning application, the floorplan manager application may send a signal to the application controller 113 to enter a before process event phase 506. In the event phase 506, the application controller 113 may check 507 the data written into the planning model 550 during write phases 503 and 505 for errors and make sure the data is valid. The application controller may also execute 508 a planning function or planning sequence 305. The execution 508 of the planning sequence 305 may generate business planning data in the application as a result of implementing the planning sequence 305 on the data previously written to the planning model 550 in phases 503 and 505.

Once the data is generated and the before process event phase 506 is complete, the floorplan manager 114 may initiate process before output phases 509 and 510. During these phases 509 and 510, the search and analytics list building blocks 111 and 112 read the generated data 510 and 512 from the planning model 550. The building blocks 111 and 112 may then format the data for use in the user computing system 560 or other computing systems.

In the exemplary output of an embodiment shown in FIG. 6, the view options 604 and create proposal 605 functionality may have been selectively enabled and included in the application through functionality in the analytics list building block 112. In this example, the create proposal button 605 may be linked to a planning sequence 508 where different parameters and options in a business plan may be changed or modified and results of those changes may be updated. In an embodiment, the results may be updated in the data 606 and/or graph 607 sections of the output. In other embodiments, the results may be updated in external files, tables, or databases in different systems, or the results may cause business processes in other systems, such as ERP systems, to be updated.

The filter functionality 602 and execute button 603 may be connected to the search building block 111, the data 606 may be connected to the analytics list building block 112, and graph 607 may be connected to the application specific building block 117. With this connectivity, as parameters, such as the filter parameters 602, are changed, the data shown in the data 606 and graph 607 sections retrieved from the ERP and/or business intelligence systems through the search building block 111 may also be updated to reflect the changes. In an embodiment, the information resulting in the data 606 and/or graph 607 sections of the output may be obtained from ERP and/or business intelligence systems through the analytics list building block 112.

Figure 7:
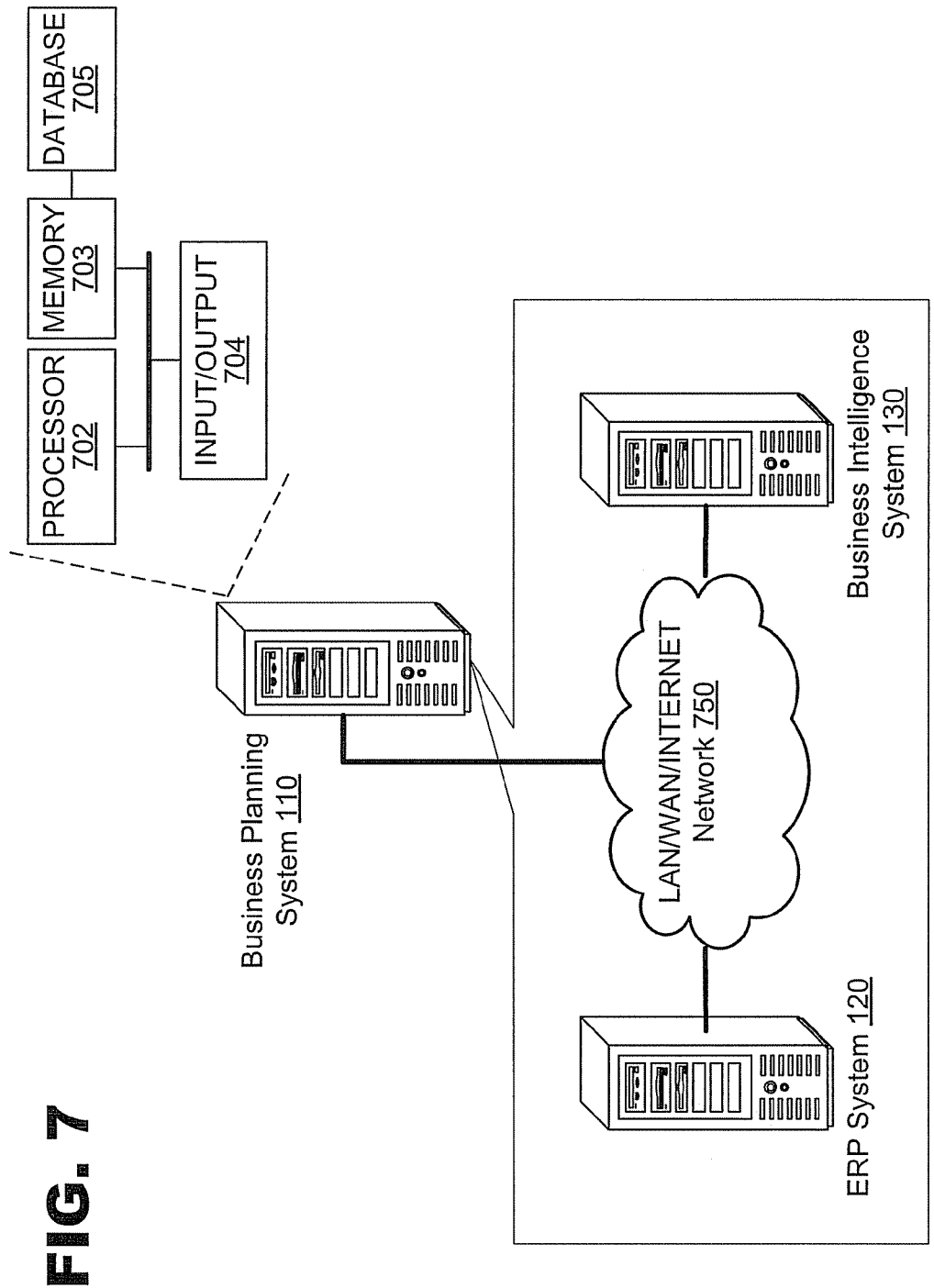
FIG. 7 shows an embodiment of a business planning system coupled to an ERP system and business intelligence system in an embodiment through a network.

FIG. 7 shows an embodiment of a business planning system 110 coupled to a ERP system 120 and business intelligence system 130 in an embodiment through a network 750. In an embodiment, two or all three of these systems 110, 120, and 130 may be consolidated or integrated into a single computing system or may be part of a larger enterprise system, though in other embodiments, some or all of these systems may be separate, independent computing systems.

Each of the systems in FIG. 7 may contain a processing device 702, memory 703 containing a database 705, and an input/output interface 704, all of which may be interconnected via a system bus. In various embodiments, each of the systems 110, 120, and 130 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 703 may contain different components for retrieving, presenting, changing, and saving data. Memory 703 may include a variety of memory devices, for example, Dynamic Random Access Memory (DRAM), Static RAM (SRAM), flash memory, cache memory, and other memory devices. Additionally, for example, memory 703 and processing device(s) 702 may be distributed across several different computers that collectively comprise a system.

Processing device 702 may perform computation and control functions of a system and comprises a suitable central processing unit (CPU). Processing device 702 may comprise a single integrated circuit, such as a microprocessing device, or may comprise any suitable number of integrated circuit devices and/or circuit boards working in cooperation to accomplish the functions of a processing device. Processing device 702 may execute computer programs, such as object-oriented computer programs, within memory 703.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

I claim:

1. A method comprising:
    initiating a feeder class from a plurality of feeder classes specifying a protocol, format, and language for transferring data between a predetermined business intelligence system or enterprise resource planning system and a user interface, the initiated feeder class transferring, through a processing device, data associated with data field identifiers included in a function linked to the initiated feeder class that is executed at the business intelligence system, the function manipulating data stored in the enterprise resource planning system;
    responsive to a user selecting a subset of the data field identifiers, restricting a selection of business process steps in the enterprise resource planning system to those steps involving the selected data field identifiers;
    applying a user supplied value of data associated with the user selected data field identifiers to a business planning function associated with the restricted selection of business process steps to calculate a performance metric of a selected business process step, the business planning function representing a step in an automated business process executed by the enterprise resource planning system; and
    automatically updating the calculation to reflect a change to at least one of the user supplied value, the user selected data field identifiers, and the selected business process step.

2. The method of claim 1, wherein the performance metric is selected from the group consisting of: a cost, a duration, a quantity, a profit, and a measure of efficiency.

3. The method of claim 1, further comprising performing a statistical analysis on the calculated performance metric to identify historical patterns of the business planning function.

4. The method of claim 1, further comprising performing a statistical analysis on the calculated performance metric to predict future performance of the business planning function.

5. The method of claim 1, wherein the function executed at the business intelligence system is a query, a filter, the business planning function, or a planning sequence.

6. The method of claim 1, further comprising executing a floorplan manager application configured to perform the method recited in claim 1.

7. The method of claim 6, wherein the floorplan manager application is a Web Dynpro application including a model object that encapsulates an interface to the business intelligence system.

8. The method of claim 6, wherein the floorplan manager application is a Web Dynpro application including a model object that encapsulates an interface to the enterprise resource planning system.

9. The method of claim 1, wherein the business intelligence system perform statistical analyses on stored data to identify historical patterns or predict future performance while the enterprise resource planning system stores the underlying data of the organization.

10. The method of claim 1, wherein the business planning function encompasses a plurality of other business planning functions.

11. The method of claim 1, wherein the enterprise resource planning system is a customer relationship management (CRM) system or a Business Suite system.

12. A system comprising:
    a business planning system including a search building block, an analytics list building block, and an application controller; and a business intelligence system coupled to the business planning system through a network;

the search building block configured to extracting a business planning function from a business intelligence system, the business planning function representing a step in an automated business process executed by the business intelligence system using data from an enterprise resource management system, the search building block including a feeder class specifying a protocol, format, and language for transferring data between a predetermined business intelligence system or enterprise resource planning system and a user interface, the feeder class configured to transfer data associated with identifiers of data fields included in a function linked to the feeder class within the business intelligence system, the function manipulating data stored in the enterprise resource planning system;

the application controller configured to (i) responsive to a user selecting a subset of the data field identifiers, restrict a selection of business process steps in the enterprise resource planning system to those steps involving the selected data field identifiers, (ii) apply a user supplied value of data associated with the user selected data field identifiers to the business planning function associated with the restricted selection of business process steps to calculate a performance metric of a selected business process step, and (iii) update the calculation to reflect a change to at least one of the user supplied value, the user selected data field identifiers, and the selected business process step, and the analytics list building block configured to present a structure for a user to make the change that the application controller applies to calculate the performance metric.

13. The system of claim 12, wherein the structure presented in the analytics list building block limits the subset of data that may be selected to data fields having identifiers designated in the search building block.

14. The system of claim 12, wherein the function executed at the business intelligence system is a query, a filter, the business planning function, or a planning sequence.

15. The system of claim 12, wherein the analytics list building block is configured to create the structure presented to the user based on parameters obtained from the business intelligence system.

16. The system of claim 12, wherein the structure presented includes a button choice item linked to a toolbar element, the activation of the button choice item causing an execution of an event parameter linked to the button choice item.

17. An article of manufacture comprising a computer readable medium storing a set of instructions that, when executed by a processing device, cause the processing device to perform a method comprising:

initiating a feeder class from a plurality of feeder classes specifying a protocol, format, and language for transferring data between a predetermined business intelligence system or enterprise resource planning system and a user interface, the initiated feeder class transferring, through a processing device, data associated with data field identifiers included in a function linked to the initiated feeder class that is executed at the business intelligence system, the function manipulating data stored in the enterprise resource planning system;

responsive to a user selecting a subset of the data field identifiers, restricting a selection of business process steps in the enterprise resource planning system to those steps involving the selected data field identifiers;

applying a user supplied value of data associated with the user selected data field identifiers to a business planning function associated with the restricted selection of business process steps to calculate a performance metric of a selected business process step, the business planning function representing a step in an automated business process executed by the enterprise resource planning system; and automatically updating the calculation to reflect a change to at least one of the user supplied value, the user selected data field identifiers, and the selected business process step.

18. The article of manufacture of claim 17, wherein a business planning application is created as a result of executing the instructions.

19. The article of manufacture of claim 18, wherein the performance metric is created during an execution of the business planning application, the performance metric including a future prediction extrapolated from a historical trend.

20. The article of manufacture of claim 17, wherein the business planning function is an algorithm.

* * * * *